(12) United States Patent
Mullaney et al.

(10) Patent No.: US 7,953,311 B2
(45) Date of Patent: May 31, 2011

(54) FIBER OPTIC CABLE CONTROL CLIPS AND ENCLOSURE ASSEMBLIES AND METHODS INCORPORATING THE SAME

(75) Inventors: Julian Mullaney, Raleigh, NC (US); Justin Everette Thompson, Angier, NC (US); William Alan Carrico, Raleigh, NC (US)

(73) Assignee: Tyco Electronics Corporation, Middletown, PA (US)

(*) Notice: Subject to any disclaimer, the term of this patent is extended or adjusted under 35 U.S.C. 154(b) by 0 days.

(21) Appl. No.: 12/703,622

(22) Filed: Feb. 10, 2010

(65) Prior Publication Data

US 2010/0142909 A1    Jun. 10, 2010

Related U.S. Application Data

(63) Continuation of application No. 12/198,298, filed on Aug. 26, 2008, now Pat. No. 7,738,761.

(60) Provisional application No. 60/966,302, filed on Aug. 27, 2007, provisional application No. 61/005,174, filed on Dec. 3, 2007.

(51) Int. Cl.
*G02B 6/00*    (2006.01)

(52) U.S. Cl. ......... 385/137; 385/134; 385/135; 385/136

(58) Field of Classification Search ............ 385/135–137
See application file for complete search history.

(56) References Cited

U.S. PATENT DOCUMENTS

| | | | |
|---|---|---|---|
| 3,915,540 A | 10/1975 | Thompson et al. | |
| 4,961,623 A | 10/1990 | Midkiff et al. | |
| 4,986,761 A | 1/1991 | Gladden, Jr. et al. | |
| 4,991,928 A * | 2/1991 | Zimmer | 385/137 |
| 5,181,272 A | 1/1993 | Hopper | |
| 5,235,665 A | 8/1993 | Marchesi et al. | |
| 5,271,080 A | 12/1993 | Hopper et al. | |
| 5,590,234 A | 12/1996 | Pulido | |
| 5,638,477 A | 6/1997 | Patterson et al. | |
| 5,684,911 A | 11/1997 | Burgett | |
| 5,790,741 A | 8/1998 | Vincent et al. | |

(Continued)

FOREIGN PATENT DOCUMENTS

EP    1 376 175 A2    1/2004

(Continued)

OTHER PUBLICATIONS

International Search Report and Written Opinion (16 pages) corresponding to International Appl. No. PCT/US2008/010103; Mailing Date: Dec. 18, 2008.

(Continued)

*Primary Examiner* — Ryan Lepisto
(74) *Attorney, Agent, or Firm* — Myers Bigel Sibley & Sajovec, PA

(57) ABSTRACT

An enclosure assembly for use with a fiber optic cable, the cable having a lengthwise cable axis and including a plurality of optical fibers and a jacket surrounding the optical fibers includes an enclosure housing and a cable control clip. The enclosure housing defines a chamber to receive the cable. The cable control clip is configured to be inserted through the cable to extend radially between the optical fibers and the jacket to limit contact between the optical fibers and one or more other components of the cable, and to limit displacement of the enclosure housing relative to the cable when the cable control clip is disposed in the chamber.

18 Claims, 15 Drawing Sheets

U.S. PATENT DOCUMENTS

| | | | |
|---|---|---|---|
| 5,793,920 A * | 8/1998 | Wilkins et al. | 385/135 |
| 6,091,876 A | 7/2000 | Hizuka et al. | |
| 6,363,198 B1 | 3/2002 | Braga et al. | |
| 6,466,727 B1 | 10/2002 | Leeb | |
| 6,829,424 B1 | 12/2004 | Finzel et al. | |
| 7,251,411 B1 | 7/2007 | Lu et al. | |
| 7,317,863 B2 | 1/2008 | Lu et al. | |
| 7,356,237 B2 | 4/2008 | Mullaney et al. | |
| 7,477,826 B2 | 1/2009 | Mullaney et al. | |
| 7,503,707 B2 | 3/2009 | Ray et al. | |
| 2002/0039476 A1 | 4/2002 | Sauve et al. | |
| 2004/0149486 A1 | 8/2004 | Douglas et al. | |
| 2004/0170369 A1 | 9/2004 | Pons | |
| 2005/0207711 A1 | 9/2005 | Vo et al. | |
| 2006/0246771 A1 | 11/2006 | Pepe et al. | |
| 2006/0283619 A1 | 12/2006 | Kowalczyk et al. | |
| 2007/0177847 A1 | 8/2007 | Krampotich et al. | |
| 2008/0170832 A1 | 7/2008 | Mullaney et al. | |
| 2008/0181570 A1 | 7/2008 | Mullaney | |

FOREIGN PATENT DOCUMENTS

| | | |
|---|---|---|
| FR | 2 273 386 A | 12/1975 |
| WO | WO 2004/003617 A1 | 1/2004 |
| WO | WO 2004/081614 A2 | 9/2004 |
| WO | WO 2007/050537 A2 | 5/2007 |
| WO | WO 2009/029258 A1 | 3/2009 |

OTHER PUBLICATIONS

International Search Report and Written Opinion of the International Searching Authority issued by the European Patent Office on Feb. 4, 2010 for corresponding PCT Appl. No. PCT/US2009/004929.

* cited by examiner

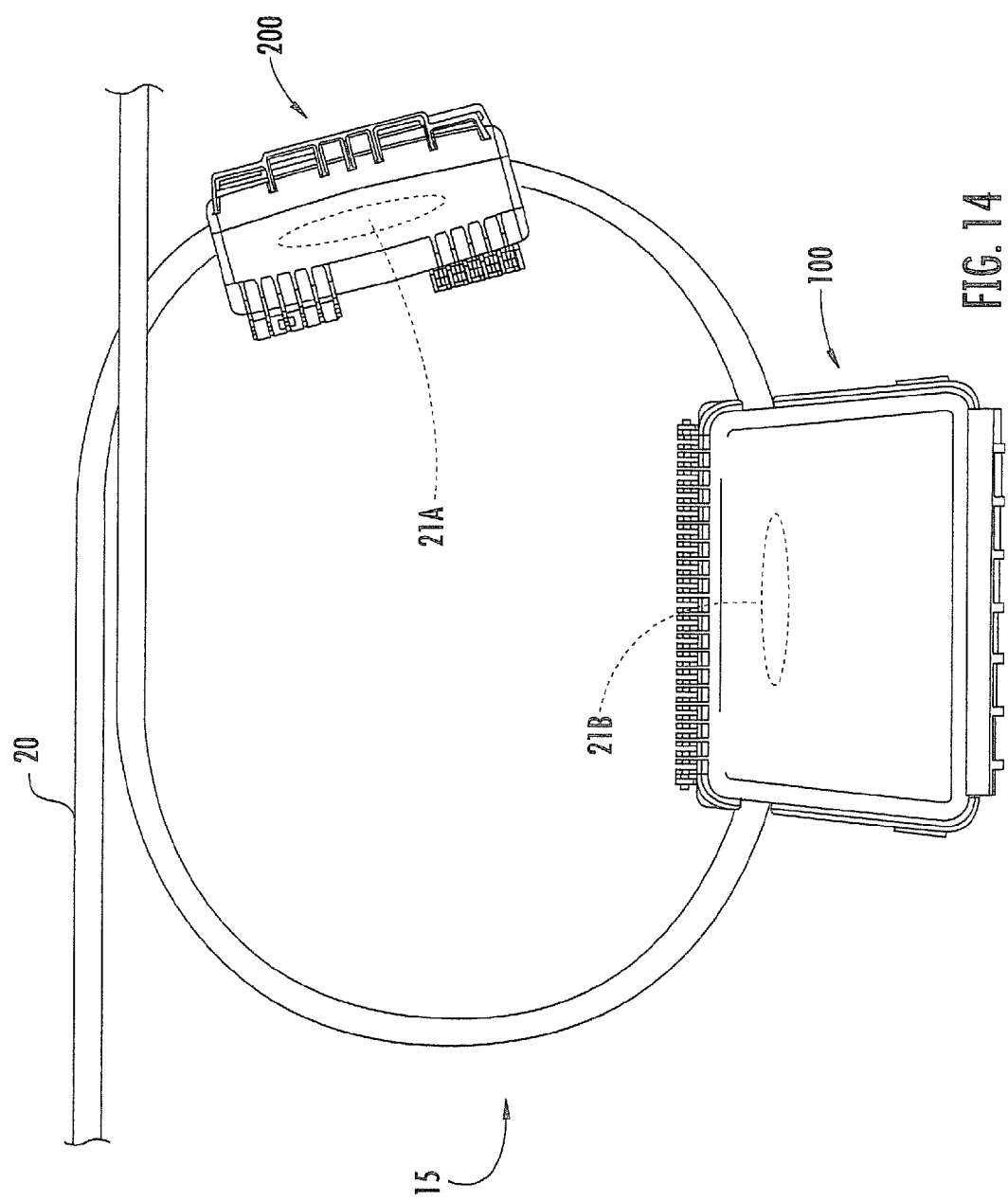

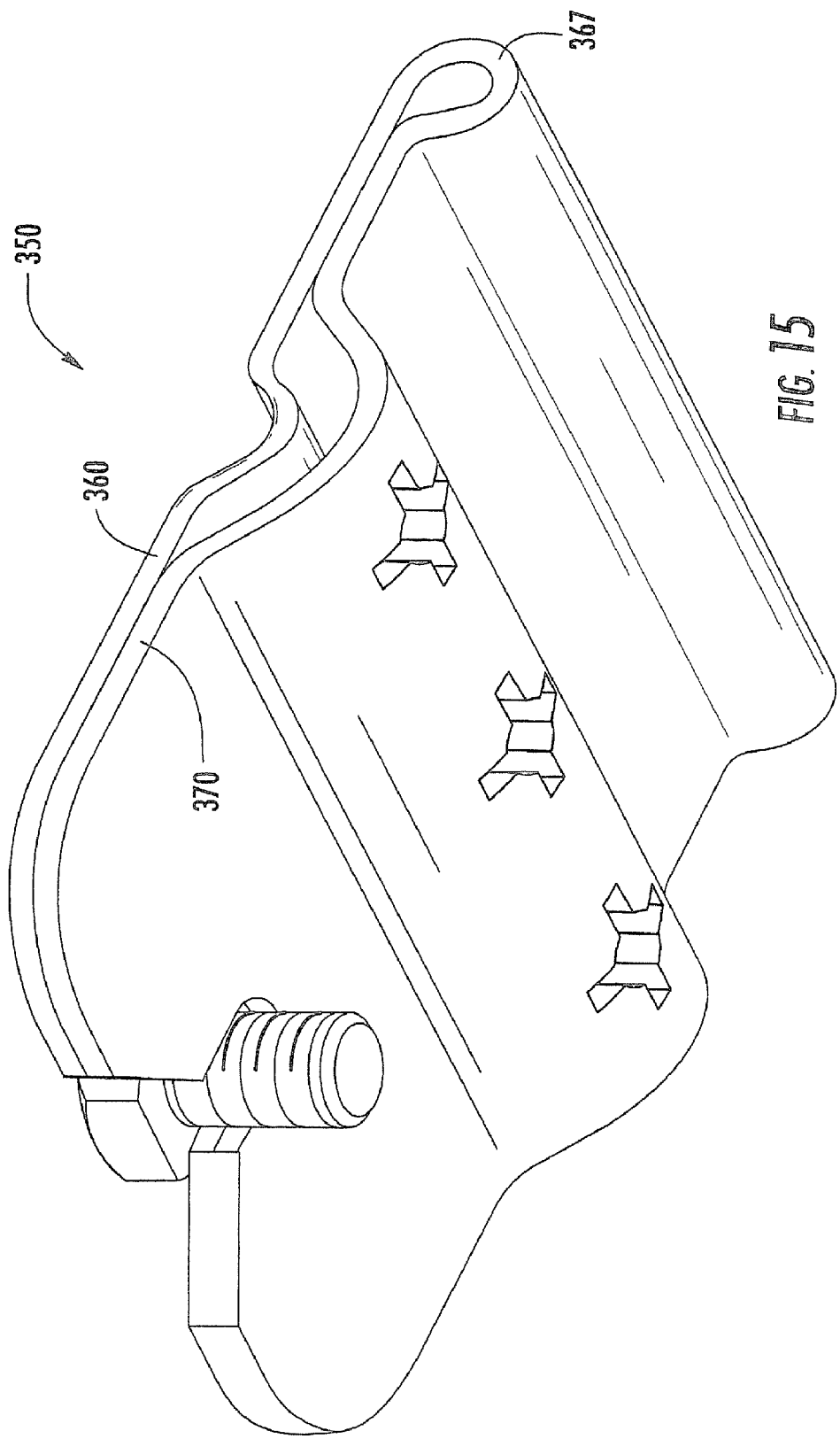

FIBER OPTIC CABLE CONTROL CLIPS AND ENCLOSURE ASSEMBLIES AND METHODS INCORPORATING THE SAME

RELATED APPLICATION(S)

The present application is a continuation of U.S. patent application Ser. No. 12/198,289, filed Aug. 26, 2008 now U.S. Pat. No. 7,738,761, which claims the benefit of U.S. Provisional Patent Application No. 60/966,302, filed Aug. 27, 2007, and U.S. Provisional Patent Application No. 61/005,174, filed Dec. 3, 2007, the disclosures of which are hereby incorporated herein by reference in their entireties.

FIELD OF THE INVENTION

The present invention relates to fiber optic cables and, more particularly, to enclosures for fiber optic cables.

BACKGROUND OF THE INVENTION

The present invention relates to communication cable termination systems and, more particularly, to optical fiber termination systems and methods for terminating the same.

An extensive infrastructure supporting telecommunication has been developed, traditionally based upon copper wire connections between individual subscribers and telecommunications company network distribution points. More recently, much of the telecommunications network infrastructure is being extended or replaced with an optical fiber based communications network infrastructure. The carrying capacity and communication rate capabilities of such equipment may exceed that provided by conventional copper wired systems.

As such, fiber optic cables are widely used for telecommunications applications where high information capacity, noise immunity and other advantages of optical fibers may be exploited. Fiber cable architectures are emerging for connecting homes and/or business establishments, via optical fibers, to a central location. A trunk or main cable may be routed, for example, through a housing subdivision and small fiber count "drop cables" may be spliced to the main cable at predetermined spaced apart locations.

A typical main cable may be installed underground and have multiple drop cables connected thereto, each of a hundred feet or more. Each of the drop cables, in turn, may be routed to an optical network unit (ONU) serving several homes. Information may then be transmitted optically to the ONU, and into the home, via conventional copper cable technology, although it also has been proposed to extend optical fiber all the way to the home rather than just to the ONU. Thus, the drop cables may serve groups of users, although other architectures may also employ a main cable and one or more drop cables connected thereto.

SUMMARY OF THE INVENTION

According to some embodiments of the present invention, an enclosure assembly is provided for use with a fiber optic cable, the cable having a lengthwise cable axis and including a plurality of optical fibers and a jacket surrounding the optical fibers. The enclosure assembly includes an enclosure housing and a cable control clip. The enclosure housing defines a chamber to receive the cable. The cable control clip is configured to be inserted through the cable to extend radially between the optical fibers and the jacket to limit contact between the optical fibers and one or more other components of the cable, and to limit displacement of the enclosure housing relative to the cable when the cable control clip is disposed in the chamber. In some embodiments, the cable control clip is affixed to the enclosure housing.

According to some embodiments, the cable control clip includes first and second clip members coupled to one another. The first clip member includes a first wall configured to extend between the optical fibers and the jacket. The second clip member includes a second wall configured to extend around an exterior of the jacket.

In some embodiments, the cable control clip includes a unitarily formed clip member. The clip member includes a first wall and a second wall connected by a bend portion. The clip member is configured to loop around the cable such that the first wall extends between the optical fibers and the jacket, and the second wall extends around an exterior of the jacket.

The cable control clip may include a fiber groove configured to receive the optical fibers and to extend radially into the jacket.

The cable control clip can be configured to grip the cable. In some embodiments, the cable control clip includes at least one projection configured to embed into the jacket to resist axial displacement of the jacket relative to the cable control clip.

According to some embodiments, when mounted on the cable, the cable control clip permits the cable to float axially a limited distance with respect to the cable control clip.

The cable control clip may be configured to extend radially between the optical fibers and the jacket and a strength member forming a part of the cable concurrently such that the cable control clip limits contact between the optical fibers and the strength member.

The cable control clip can be metal.

According to some embodiments, the housing includes a cable entrance port and a cable exit port. The cable entrance port is in communication with the chamber and configured to receive the cable therethrough along an entrance axis. The cable exit port is in communication with the chamber and is configured to receive the cable therethrough along an exit axis. The entrance axis and the exit axis are nonparallel with respect to one another.

According to some embodiments of the present invention, the enclosure assembly is combined with a fiber optic cable to provide an enclosed fiber optic cable assembly. The fiber optic cable has a lengthwise cable axis and includes a plurality of optical fibers and a jacket surrounding the optical fibers. The cable extends through the chamber. The cable control clip is inserted through the cable and extends radially between the optical fibers and the jacket, and is disposed in the chamber. The cable control clip limits contact between the optical fibers and one or more other components of the cable and limits displacement of the enclosure housing relative to the cable.

According to some embodiments, the cable further includes a buffer tube and a strength member. The cable control clip extends radially between the optical fibers and the jacket, the strength member and the buffer tube concurrently and limits contact between the optical fibers and the strength member and the buffer tube.

In some embodiments, the optical fibers extend fully through the enclosure housing uncut and the jacket extends fully and continuously through the enclosure housing. The jacket includes a longitudinally extending access opening through which the optical fibers are accessible. The cable control clip is inserted through the access opening.

According to further embodiments of the present invention, a cable control clip is provided for use with a fiber optic cable and an enclosure housing, the cable having a lengthwise cable axis and including a plurality of optical fibers and a jacket surrounding the optical fibers, the enclosure housing defining a chamber to receive the cable. The cable control clip is configured to be inserted through the cable to extend radially between the optical fibers and the jacket to limit contact between the optical fibers and one or more other components of the cable, and to limit displacement of the enclosure housing relative to the cable when the cable control clip is disposed in the chamber.

According to method embodiments of the present invention, a method is provided for enclosing a portion of a fiber optic cable, the cable having a lengthwise cable axis and including a plurality of optical fibers and a jacket surrounding the optical fibers. The method includes: inserting a cable control clip through the cable such that the cable control clip extends radially between the optical fibers and the jacket; and placing the cable and the cable control clip in a chamber of an enclosure housing. The cable control clip limits contact between the optical fibers and one or more other components of the cable, and limits displacement of the enclosure housing relative to the cable. The method may include affixing the cable control clip to the enclosure housing.

In some embodiments, inserting the cable control clip through the cable includes positioning the optical fibers in a fiber groove of the cable control clip.

According to some embodiments, inserting the cable control clip through the cable includes inserting the cable control clip through the cable such that the cable control clip extends radially between the optical fibers and the jacket and a strength member of the cable and limits contact between the optical fibers and the strength member.

The method may include, prior to inserting the cable control clip through the cable, removing a scalloped segment of the jacket to form a longitudinally extending, radially open access opening through which the optical fibers are accessible. Inserting the cable control clip through the cable includes inserting the cable control clip through the access opening. Inserting the cable control clip through the cable may include inserting the cable control clip through the access opening and between the jacket and portions of the optical fibers extending fully across the access opening uncut. In some embodiments, the method further includes: removing a second scalloped segment of the jacket to form a second longitudinally extending access opening at a second location axially spaced apart along a length of the cable from the first access opening and through which the optical fibers are accessible; inserting a second cable control clip through the second access opening such that the second cable control clip extends radially between the optical fibers and the jacket at the second access opening; and placing the cable and the second cable control clip in a second chamber of a second enclosure housing, wherein the second cable control clip limits contact between the optical fibers and one or more other components of the cable and limits displacement of the second enclosure housing relative to the cable. The optical fibers extend fully through the first and second enclosure housings uncut and the jacket extends fully and continuously through the first and second enclosure housings.

Further features, advantages and details of the present invention will be appreciated by those of ordinary skill in the art from a reading of the figures and the detailed description of the preferred embodiments that follow, such description being merely illustrative of the present invention.

BRIEF DESCRIPTION OF THE DRAWINGS

FIG. 14 is a top plan view of a fiber optic cable enclosure system according to embodiments of the present invention and including the cable enclosure assemblies of FIGS. 1 and 9.

FIG. 15 is a bottom, perspective view of a cable control clip according to further embodiments of the present invention.

DETAILED DESCRIPTION OF EMBODIMENTS OF THE INVENTION

Figure 1:
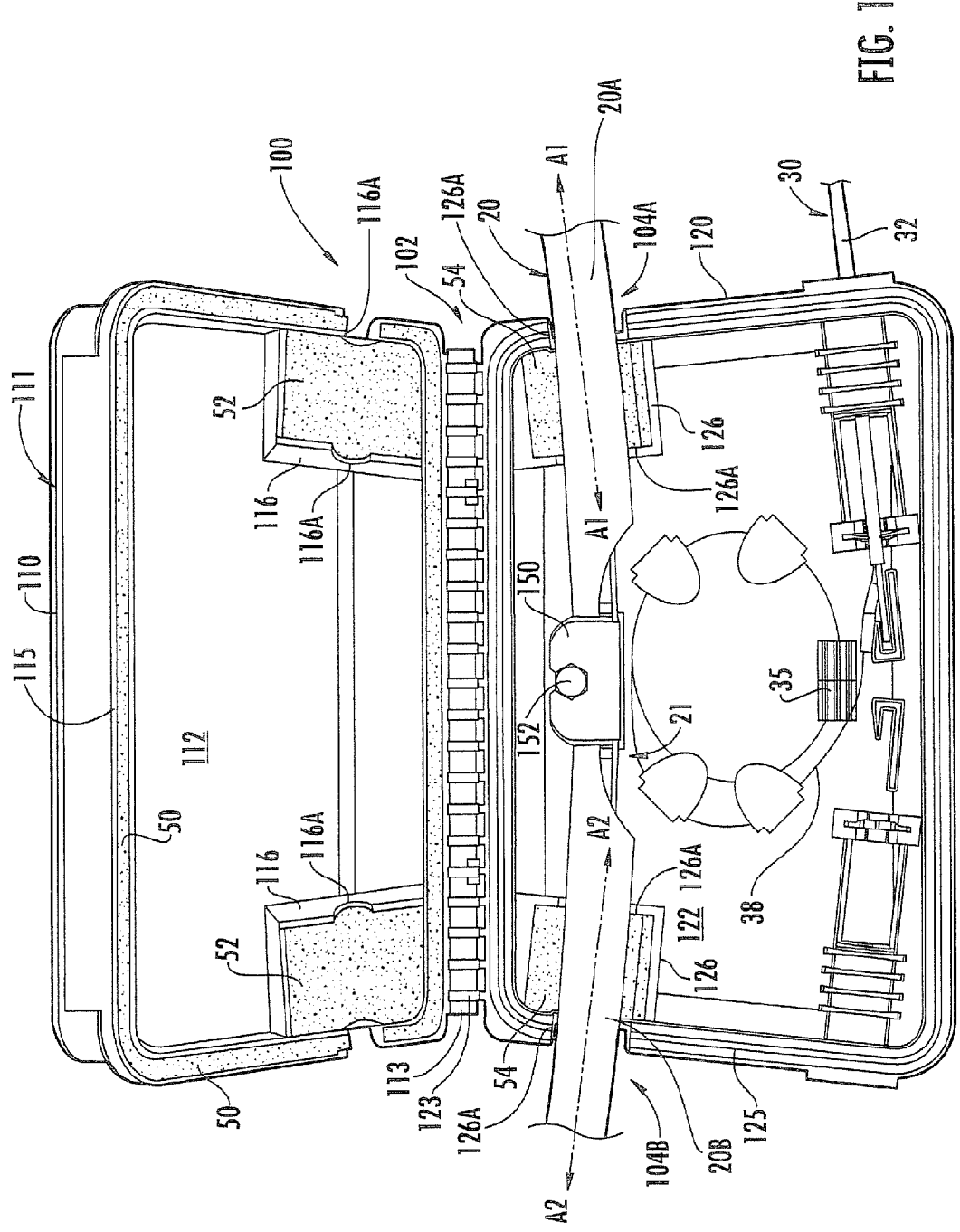
FIG. 1 is a top plan view of a cable enclosure assembly according to embodiments of the present invention in an open position.

The present invention now will be described more fully hereinafter with reference to the accompanying drawings, in which illustrative embodiments of the invention are shown. In the drawings, the relative sizes of regions or features may be exaggerated for clarity. This invention may, however, be embodied in many different forms and should not be construed as limited to the embodiments set forth herein; rather, these embodiments are provided so that this disclosure will be thorough and complete, and will fully convey the scope of the invention to those skilled in the art.

It will be understood that when an element is referred to as being "coupled" or "connected" to another element, it can be directly coupled or connected to the other element or intervening elements may also be present. In contrast, when an element is referred to as being "directly coupled" or "directly connected" to another element, there are no intervening elements present. Like numbers refer to like elements throughout.

In addition, spatially relative terms, such as "under", "below", "lower", "over", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein the expression "and/or" includes any and all combinations of one or more of the associated listed items.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of this disclosure and the relevant art and will not be interpreted in an idealized or overly formal sense unless expressly so defined herein.

Embodiments of the present invention provide cable control clips for locating a cable enclosure with respect to a fiber optic cable on which the cable enclosure is mounted. According to some embodiments, a small access opening is formed in a jacket of the fiber optic cable to provide access to the optical fibers in the cable and the cable enclosure is mounted on the cable to cover the access opening. The cable control clip can be inserted through the access opening to engage the fiber optic cable. The cable control clip can be further secured to the cable enclosure.

Embodiments of the present invention include cable control clips configured to be inserted through a fiber optic cable to extend radially between the optical fibers and a surrounding jacket of the fiber optic cable. The cable control clip, once installed, can separate the optical fibers from one or more other components of the fiber optic cable (e.g., a buffer tube, one or more strength members, a metal shield layer or ground sheath, and/or the jacket) to limit contact therebetween.

In some embodiments of the present invention, after a cable location where access is desired is identified, two small cable access openings are made in the cable through which the fibers can be accessed. In some embodiments, neither of the two access openings requires fully removing the cable outer jacket, fully removing the ground sheath, or fully severing the strength members (i.e., a taut sheath splice may be provided). The openings are longitudinally (along the length of the cable) separated or spaced apart by a desired distance along the axis of the cable.

In some embodiments, one or more selected fibers are sliced (cut) in one of the two openings and the sliced fiber(s) are withdrawn by pulling them from the other opening to gain access to those fibers and to provide access to a length of the fibers facilitating accessing equipment to form a splice to or connectorizing those fibers. In other words, the length between the openings may be selected to provide a desired length of the fiber(s) to work with during a subsequent operation. Thus, a fiber having a slack length greater than the size of either the first or second opening may be provided without cutting through the grounding/shielding, the strength members or the unselected fibers. As such, their continuity along the cable for electrical/magnetic/strength purposes may be maintained without cutting and re-connecting any of these members.

After splicing or the like, environmental integrity of the cable may be restored by applying a cable enclosure over each opening. A larger enclosure may be provided at the opening with the splice while a smaller enclosure is provided at the opening where the cut was originally made to allow drawing of the selected fiber(s). A cable control clip as discussed above may be used in conjunction with either or both of the cable enclosures.

With reference to FIGS. 1-7, a fiber optic cable enclosure assembly 100 according to embodiments of the present invention is shown therein. The assembly 100 can be used to enclose a portion of a fiber optic cable 20 and secure the assembly 100 with respect to the cable portion. The assembly 100 and use and operation thereof will be described herein with reference to fiber optic cables including multiple optical fiber ribbons, a buffer tube, strength members, a jacket and a metal shield layer; however, according to other embodiments, the cable control clips, enclosure assemblies and methods of the present invention may be used with fiber optic cables of other constructions (e.g., a fiber optic cable not having a metal shield layer).

Figure 2:
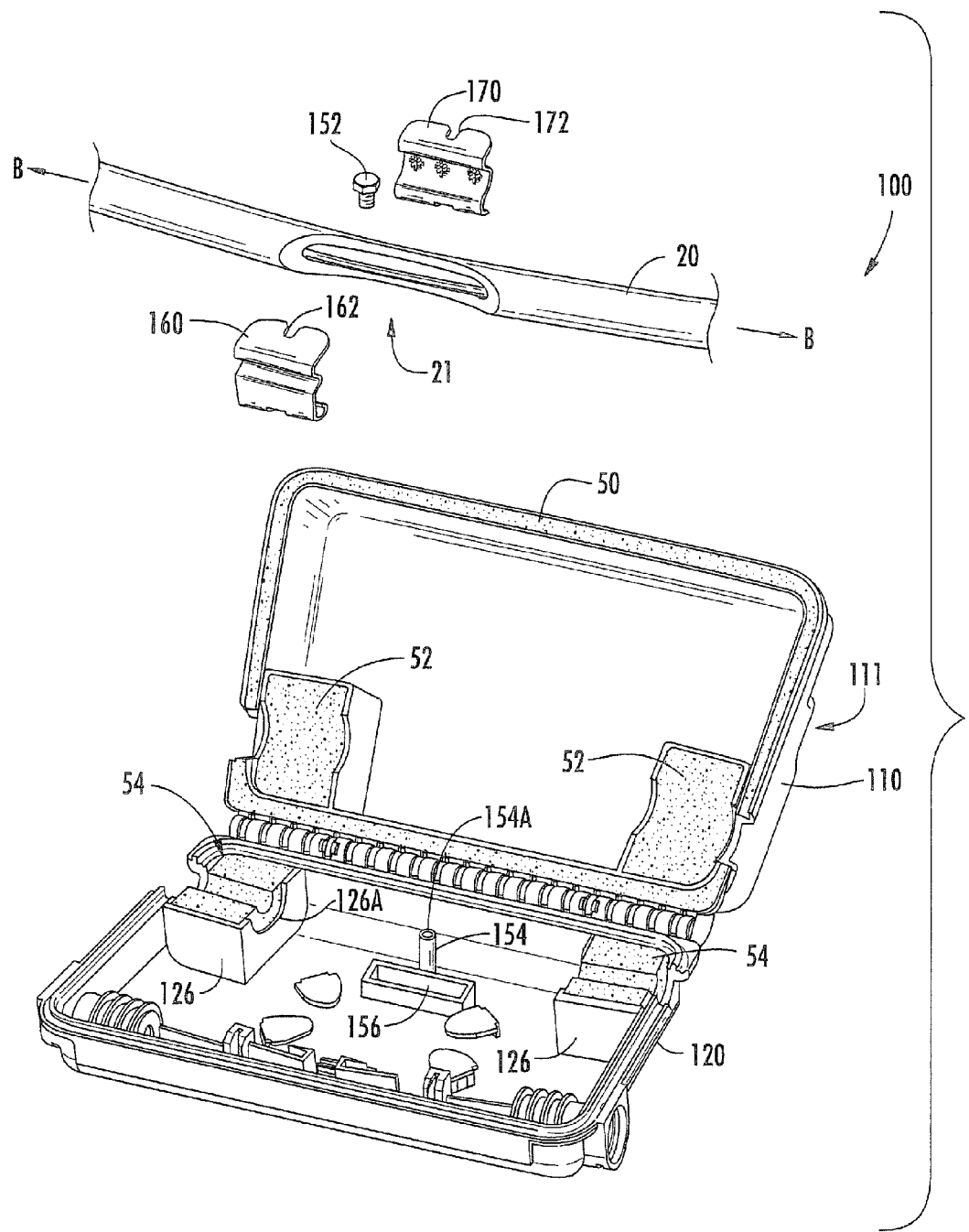
FIG. 2 is an exploded, perspective view of the cable enclosure assembly of FIG. 1 in the open position.
Figure 3:
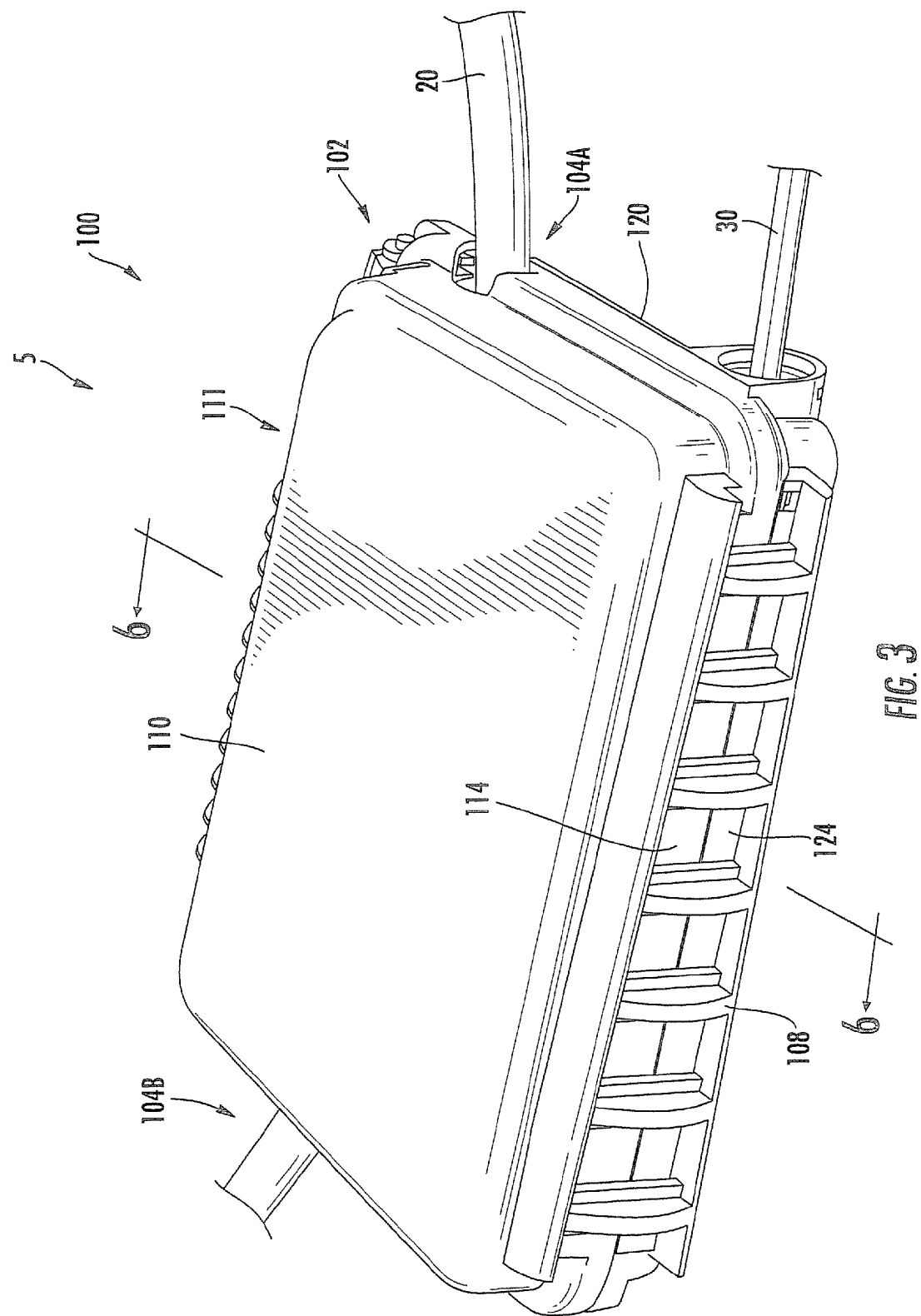
FIG. 3 is a perspective view of the cable enclosure assembly of FIG. 1 in a closed position.
Figure 6:
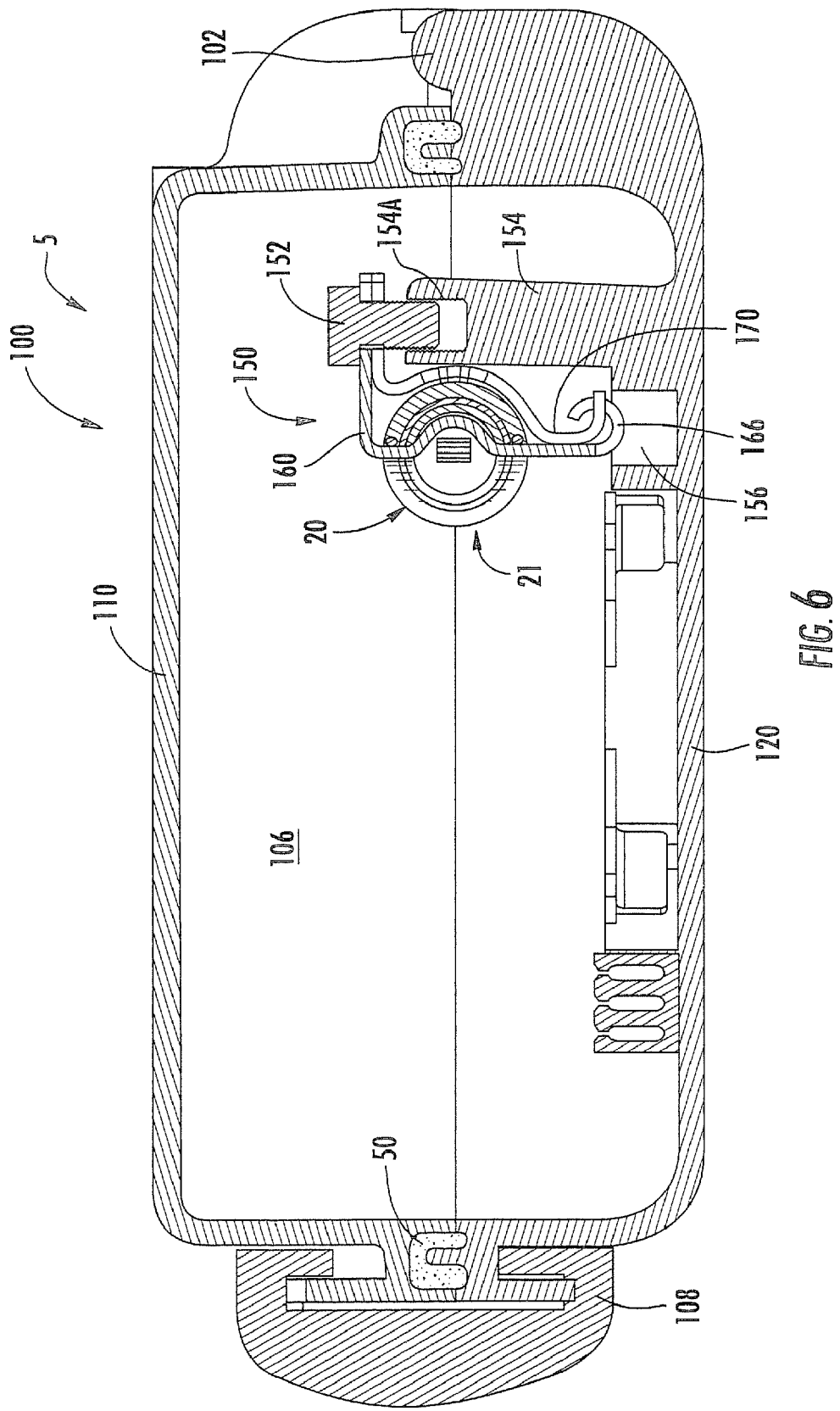
FIG. 6 is a cross-sectional view of the cable enclosure assembly of FIG. 1 taken along the line 6-6 of FIG. 3, wherein a cable is installed in the cable enclosure assembly.

With reference to FIGS. 1 and 2, the assembly 100 includes an enclosure housing 111, two upper masses of flowable cable sealant 52, two lower masses of flowable cable sealant 54, a flowable perimeter sealant 50, a latch clip 108 (FIG. 3), and a cable control clip 150. The enclosure housing 111 includes a first housing part 110 (referred to herein as the top housing part) and a second housing part 120 (referred to herein as the bottom housing part). The assembly 100 includes a hinge mechanism 102 so that the housing parts 110, 120 are relatively pivotable between an open position as shown in FIG. 1 and a closed position as shown in FIG. 3. In the closed position, the housing 111 defines a chamber 106 (FIG. 6). The assembly 100 may be referred to as a clamshell cable enclosure. An entry cable port 104A and an exit cable port 104B (FIG. 1) communicate with the chamber 106 and the exterior of the housing 111. The assembly 100 may be used with cables 20, 30 to form a splice connection assembly 5 (FIGS. 3 and 6) including an optical fiber splice 35 (FIG. 1), for example.

Figure 8:
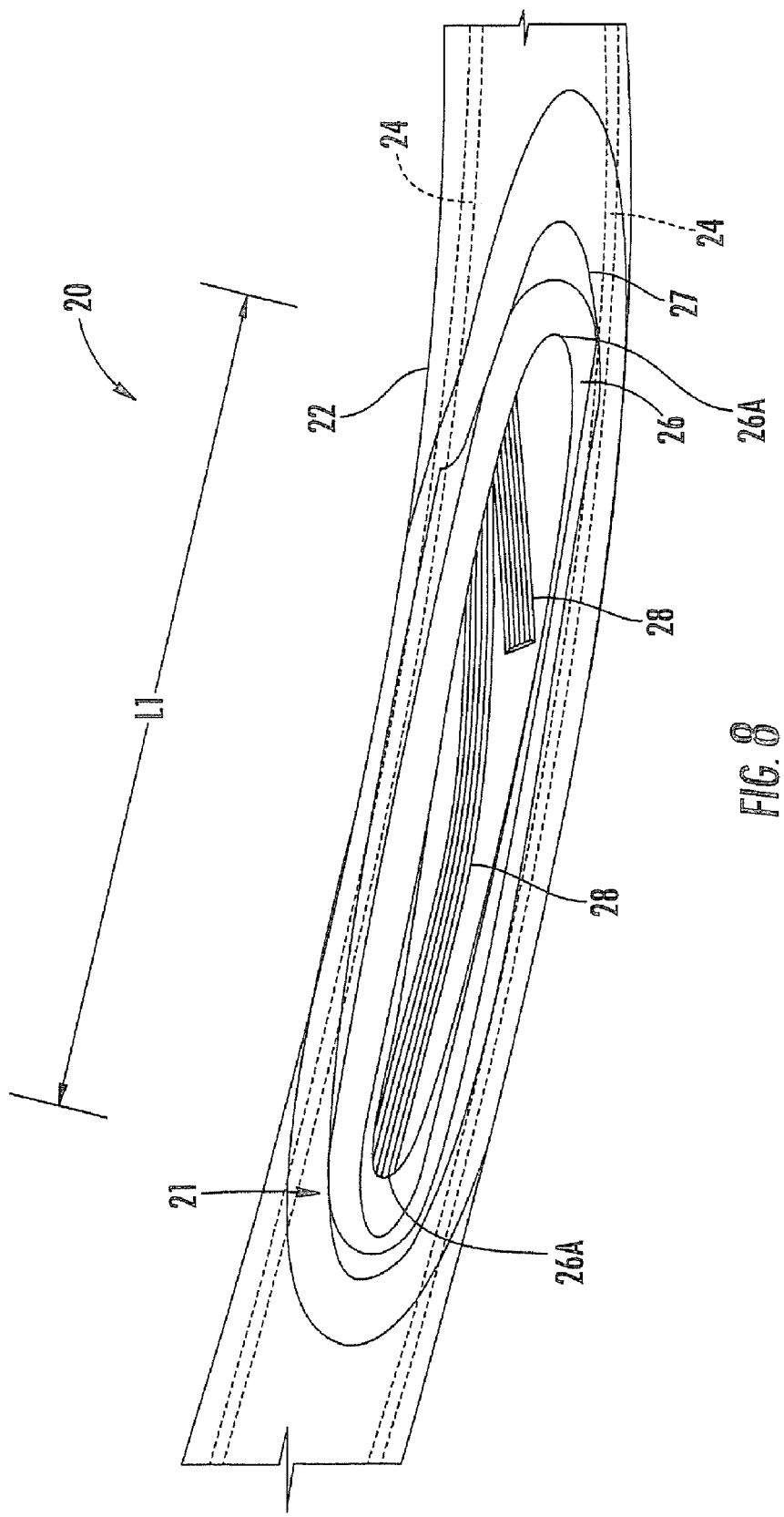
FIG. 8 is a perspective view of a fiber optic cable with an access opening formed therein.

As shown in more detail in FIG. 8, the illustrative cable 20 is an optical fiber cable including optical fibers 28 (which may be arranged as stacks of multi-fiber ribbons, as shown), a buffer tube 26 surrounding the optical fibers 28, a metal shield layer 27 surrounding the buffer tube 26, a tubular outer protective jacket 22 surrounding the metal shield layer 27, and a pair of strength members 24 extending between the outer protective jacket 22 and the buffer tube 26 on diametrically opposed sides of the cable 20. The cable 20 has a central cable axis B-B (FIG. 2) that extends lengthwise through the cable 20 substantially down the center of the outer protective jacket 22. The various described features of the illustrated cable 20 are visible in an access opening 21 formed by removing a scalloped segment as described herein. The access opening 21 has a length L1 defined by the longitudinally opposed edges 26A of the opening in the buffer tube 26.

The cable 30 (FIG. 1) may be a drop cable (e.g., a flat drop cable) including one or more optical fibers 38 surrounded by a jacket 32, for example.

With reference to FIG. 1, the top housing part 110 includes a body 112, hinge structures 113, a latch structure 114, a perimeter sealing channel 115 and a pair of containment wall structures 116. Opposed cable cutouts 116A are formed in the containment wall structures 116. The perimeter sealant 50 is disposed in the channel 115. The sealant masses 52 are disposed in sealant containment cavities defined by the containment wall structures 116.

With reference to FIGS. 1 and 2, the bottom housing part 120 includes a body 122, hinge structures 123 (FIG. 1), a latch structure 124 (FIG. 3), a perimeter sealing flange 125 (FIG. 1), and a pair of containment wall structures 126. Opposed cable cutouts 126A are formed in the containment wall structures 126. The hinge structures 123 mate with the hinge structures 113 to form the hinge mechanism 102. The sealant masses 54 are disposed in sealant containment cavities defined by the containment wall structures 126. The latch structures 114, 124 mate with the lock clip 108 to lock the housing 111 in the closed position (FIGS. 3 and 6). A plurality of clips may be mounted in the bottom housing part 120 and used to manage the optical fibers 28, 38. One or more splice holders 35 may be mounted in the bottom housing part 120 and used to hold one or more splices.

A clip mount post 154 (FIG. 2) extends upwardly from the bottom housing part 120. A bolt hole 154A is defined in the top of the clip mount post 154. A stabilizer slot 156 (FIG. 2) is also defined in the bottom housing part 120.

The housing parts 110, 120 may each be formed of any suitable material. According to some embodiments, the housing parts 110, 120 are formed of a polymeric material. Suitable polymeric materials may include polypropylene and its derivatives, or polycarbonate, for example.

As best seen in FIG. 1, the entrance port 104A has a cable entry axis A1-A1 and the exit port 104B has a cable exit axis A2-A2 that is non-parallel to the cable entry axis A1-A1. According to some embodiments, the cable entry axis A1-A1 forms an angle in the range of from about 60 to 179 with respect to the cable exit axis A2-A2 and, according to some embodiments, in the range of from about 120 to 170.

Figure 4:
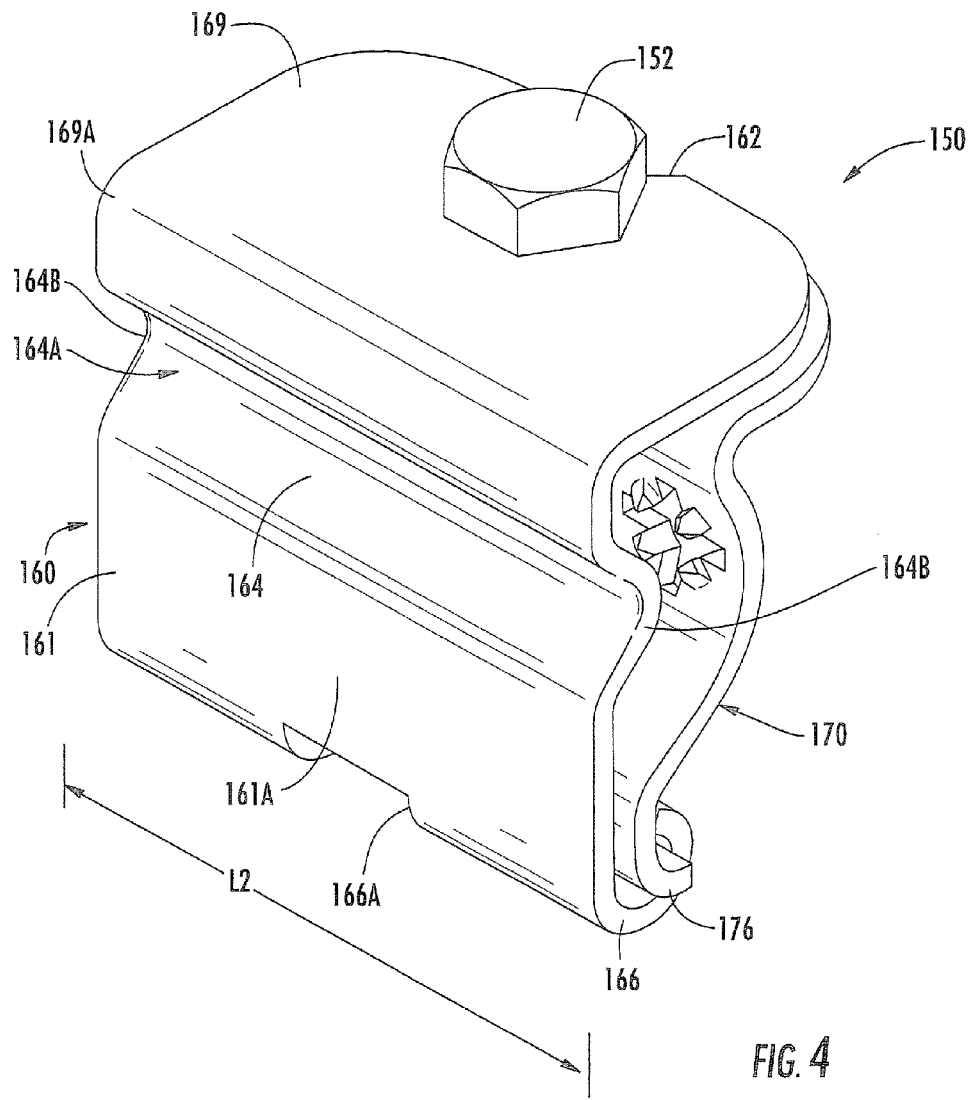
FIG. 4 is an enlarged, top, front perspective view of a cable control clip according to some embodiments of the present invention and forming a part of the cable enclosure assembly of FIG. 1.
Figure 5:
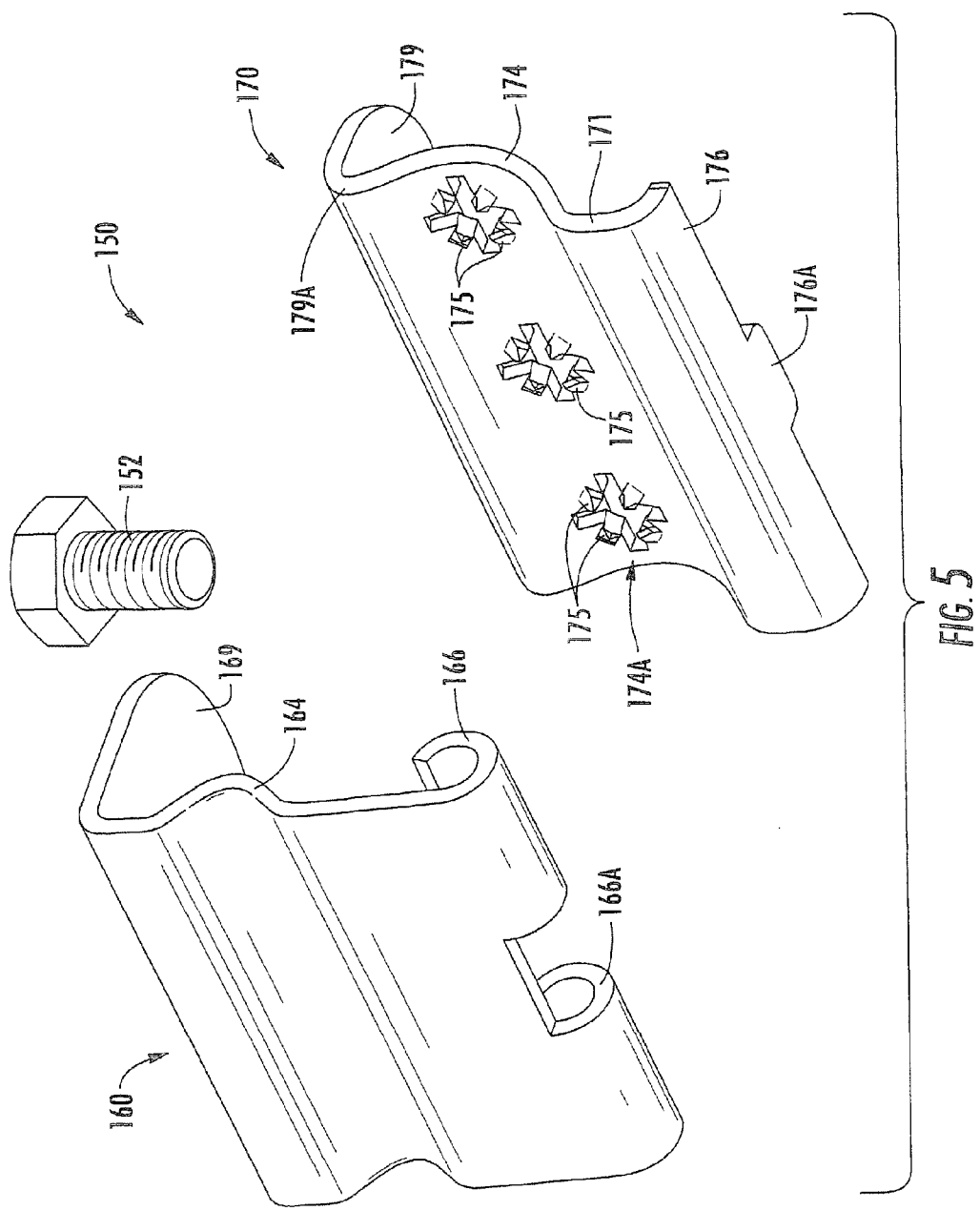
FIG. 5 is an exploded, enlarged, bottom, front perspective view of the cable control clip of FIG. 4.

With reference to FIGS. 2, 4 and 5, the cable control clip 150 includes a first clip member 160 (referred to herein as the top clip member) and a second clip member 170 (referred to herein as the bottom clip member). The clip members 160, 170 are coupled together using a bolt 152 or other suitable fastener to form the cable control clip 150, as discussed in more detail below.

With reference to FIG. 4, the top clip member 160 includes an L-shaped body 161 having a generally planar portion 161A. A bolt slot 162 is defined on a first end of the body 161. A channel portion 164 (as shown, configured as a baffle) of the clip member 160 extends longitudinally across the body 161 and projects out of the plane of the planar portion 161A and toward the bottom clip 170. According to some embodiments, the channel portion 164 is arcuate (e.g., substantially semi-circular) on both its upper and lower surfaces. The upper side of the channel portion 164 defines a longitudinally extending fiber trough or groove 164A. The opposed end edges 164B of the channel portion 164 may be beveled, rounded or smooth to reduce the risk of damaging impingement on optical fibers extending through the fiber groove 164A. A coupling flange 166 is provided on a second end of the body 161. A locator slot 166A is defined in the coupling flange 166. A bend 169A (e.g., at 90 degrees) is provided in the body 161 between the fiber groove 164A and the bolt slot 162 to define a mounting tab 169.

With reference to FIG. 5, the bottom clip member 170 includes an L-shaped body 171. A bolt slot 172 is defined on a first end of the body 171. A channel portion 174 (as shown, configured as a baffle) of the clip member 170 extends longitudinally across the body 171 and projects from the body 171 away from the top clip 160. According to some embodiments, the channel portion 174 is arcuate (e.g., substantially semi-circular) on at least its upper surface. The upper side of the channel portion 174 defines a longitudinally extending jacket groove 174A. A plurality of projections or teeth 175 project upwardly from the channel portion 174 into the jacket groove 174A. A coupling flange 176 is provided on a second end of the body 171. A locator tab 176A extends from the coupling flange 176. A bend 179A is provided in the body 171 between the jacket groove 174A and the bolt slot 172 to define a mounting tab 179.

Figure 7:
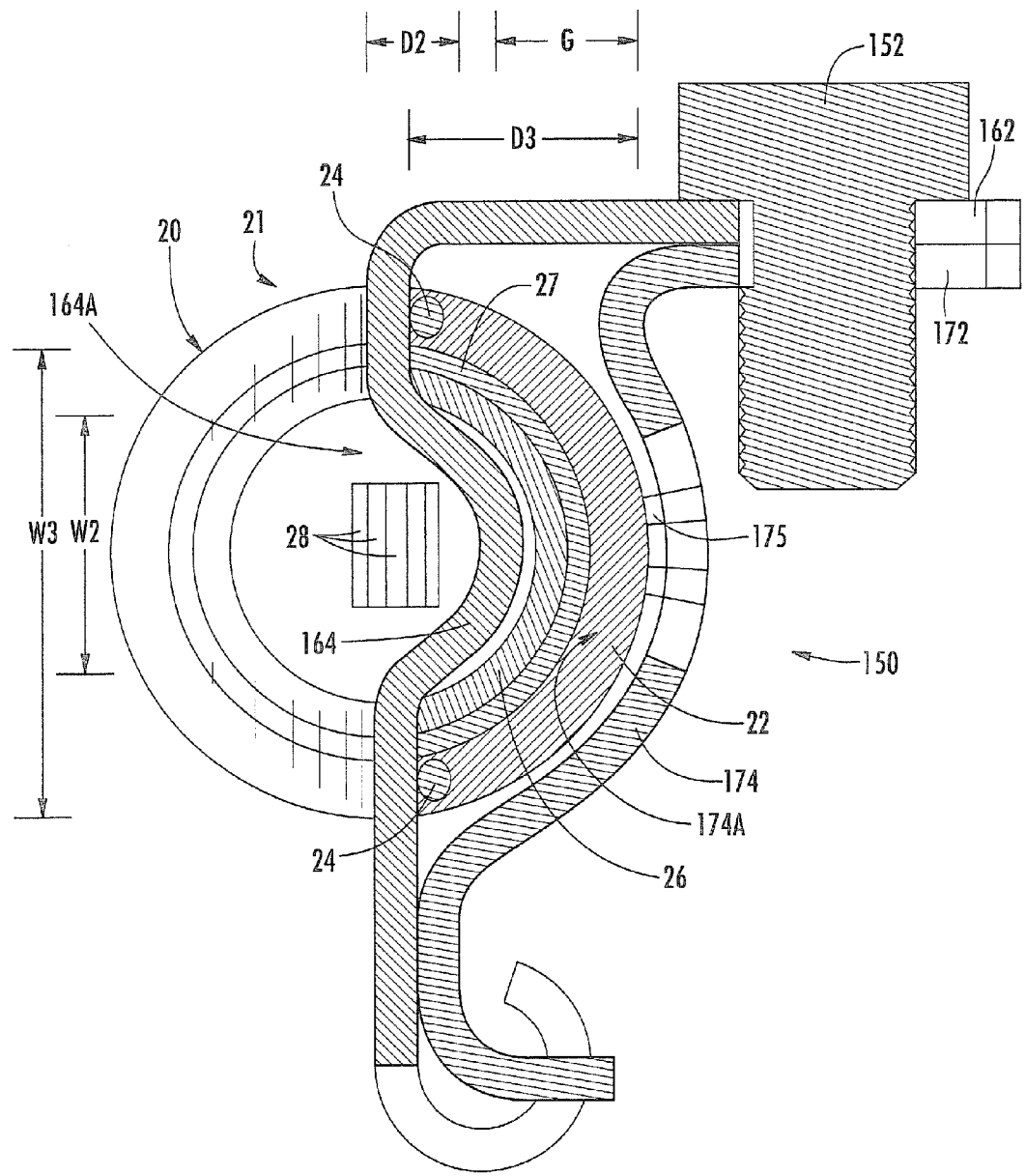
FIG. 7 is an enlarged, cross-sectional view of the cable installed in the cable control clip of FIG. 4.

The cable control clip 150 can be assembled by positioning the bottom clip member 170 below the top clip member 160, inserting the coupling flange 176 into the coupling flange 166 (with the locator tab 176A seated in the locator slot 166A), and pivoting the clip members 160, 170 into abutment as shown in FIGS. 4 and 7. The clip members 160, 170 can be secured in this position and to the bottom housing part 120 by inserting the flange 166 in the stabilizer slot 156 (FIG. 2), inserting the bolt 152 through the bolt slots 162, 172, and securing the bolt 152 in the bolt hole 154A (FIG. 2).

The clip members 160, 170 may be formed of any suitable material. According to some embodiments, the clip members 160, 170 are formed of a rigid metal. Suitable materials may include steel, aluminum or a hard plastic or polymer composite such as glass filed nylon.

According to some embodiments, the fiber groove 164A and jacket groove 174A each have a length L2 (FIG. 4) in the range of from about 2 to 6 centimeters. According to some embodiments, the depth D2 (FIG. 7) of the fiber groove 164A is in the range of from about 0.4 to 1 centimeter. According to some embodiments, the width W2 (FIG. 7) of the fiber groove 164A is in the range of from about 0.8 to 1.2 centimeters.

According to some embodiments, the depth D3 (FIG. 7) of the jacket groove 174A is in the range of from about 0.5 to 2.5 centimeters. According to some embodiments, the width W3 (FIG. 7) of the jacket groove 174A is in the range of from about 1 to 2.6 centimeters.

According to some embodiments, the distance G (FIG. 7) of the gap defined between the channel portions 164, 174 is in the range of from about 0.25 to 7 centimeters when the cable control clip 150 is assembled.

The sealants 50, 52, 54 may be any suitable sealants. According to some embodiments, the sealant 50 is a gel sealant. According to some embodiments, the sealants 52, 54 are gel sealants. According to some embodiments, all of the sealants 50, 52, 54 are gel sealants. As used herein, "gel" refers to the category of materials which are solids extended by a fluid extender. The gel may be a substantially dilute system that exhibits no steady state flow. As discussed in Ferry, "Viscoelastic Properties of Polymers," $3^{rd}$ ed. P. 529 (J. Wiley & Sons, New York 1980), a polymer gel may be a cross-linked solution whether linked by chemical bonds or crystallites or some other kind of junction. The absence of the steady state flow may be considered to be the definition of the solid-like properties while the substantial dilution may be necessary to give the relatively low modulus of gels. The solid nature may be achieved by a continuous network structure formed in the material generally through crosslinking the polymer chains through some kind of junction or the creation of domains of associated substituents of various branch chains of the polymer. The crosslinking can be either physical or chemical as long as the crosslink sites may be sustained at the use conditions of the gel.

Gels for use in this invention may be silicone (organopolysiloxane) gels, such as the fluid-extended systems taught in U.S. Pat. No. 4,634,207 to Debbaut (hereinafter "Debbaut '207"); U.S. Pat. No. 4,680,233 to Camin et al.; U.S. Pat. No. 4,777,063 to Dubrow et al.; and U.S. Pat. No. 5,079,300 to Dubrow et al. (hereinafter "Dubrow '300"), the disclosures of each of which are hereby incorporated herein by reference. These fluid-extended silicone gels may be created with non-reactive fluid extenders as in the previously recited patents or with an excess of a reactive liquid, e.g., a vinyl-rich silicone fluid, such that it acts like an extender, as exemplified by the Sylgard® 527 product commercially available from Dow-Corning of Midland, Mich. or as disclosed in U.S. Pat. No. 3,020,260 to Nelson. Because curing is generally involved in the preparation of these gels, they are sometimes referred to as thermosetting gels. The gel may be a silicone gel produced from a mixture of divinyl terminated polydimethylsiloxane, tetrakis (dimethylsiloxy)silane, a platinum divinyltetramethyldisiloxane complex, commercially available from United Chemical Technologies, Inc. of Bristol, Pa., polydimethylsiloxane, and 1,3,5,7-tetravinyltetra-methylcyclotetrasiloxane (reaction inhibitor for providing adequate pot life).

Other types of gels may be used, for example, polyurethane gels as taught in the aforementioned Debbaut '261 and U.S. Pat. No. 5,140,476 to Debbaut (hereinafter "Debbaut '476") and gels based on styrene-ethylene butylenestyrene (SEBS) or styrene-ethylene propylene-styrene (SEPS) extended with an extender oil of naphthenic or nonaromatic or low aramatic content hydrocarbon oil, as described in U.S. Pat. No. 4,369,284 to Chen; U.S. Pat. No. 4,716,183 to Gamarra et al.; and U.S. Pat. No. 4,942,270 to Gamarra. The SEBS and SEPS gels comprise glassy styrenic microphases interconnected by a fluid-extended elastomeric phase. The microphase-separated styrenic domains serve as the junction points in the systems. The SEBS and SEPS gels are examples of thermoplastic systems.

Another class of gels which may be used are EPDM rubber-based gels, as described in U.S. Pat. No. 5,177,143 to Chang et al.

Yet another class of gels which may be used are based on anhydride-containing polymers, as disclosed in WO 96/23007.

According to some embodiments, the gel has a Voland hardness, as measured by a texture analyzer, of between about 5 and 100 grams force. The gel may have an elongation, as measured by ASTM D-638, of at least 55%. According to some embodiments, the elongation is of at least 100%. The gel may have a stress relaxation of less than 80%. The gel may have a tack greater than about 1 gram.

While, in accordance with some embodiments, the sealants 50, 52, 54 are gels as described above, other types of sealants may be employed. For example, the sealants 50, 52, 54 may be silicone grease or hydrocarbon-based grease.

The assembly 100 may be used in the following manner to form a splice connection assembly 5 (FIGS. 3 and 6), for example. The cable 20 is cut to form the access opening 21. More particularly, a portion of the cable 20 is located where access to the fibers 28 is desired. A longitudinally extending segment is cut from the cable at the selected location to form the scalloped access opening 21. According to some embodiments, the access opening 21 is formed using an apparatus and/or method as disclosed in co-assigned U.S. patent application Ser. No. 12/194,178, filed Aug. 19, 2008, the disclosure of which is incorporated herein by reference. One or more splices may be formed between the cable 20 and the cable 30.

The cable control clip 150 is installed in the cable 20 through the access opening 21. More particularly, the top clip member 160 is inserted through the opening 21 between the uncut (express) optical fibers 28 and the buffer tube 26 (e.g., below the lowermost fiber ribbon) until the channel portion 164 is seated in the buffer tube 26 and the optical fibers 28 are seated in the fiber groove 164A. The coupling flange 176 of the clip member 170 is seated in the coupling flange 166 of the top clip member 160. The bottom clip member 170 is pivoted up about the coupling flanges 166, 176 into engagement with the top clip member 160 so that the cable jacket 22 is received in the jacket groove 174A.

The cable 20 with the cable control clip 150 installed thereon is placed in the open housing 111. The cable control clip 150 is secured to the bottom housing part 120 by inserting the coupling flange 166 into the stabilizer slot 156 and screwing the bolt 152 through the bolt slots 162, 172 and into the bolt hole 154A. The cable control clip 150 is thereby affixed to the housing 111 and the uncut portion of the cable 20 is thereby captured between the clip members 160, 170, as shown in FIGS. 1, 6 and 7.

The cable 20 is placed in each sealant mass 54 and the cable cutouts 126A so that, as shown in FIG. 1, a portion of the cable 20 on one side of the cable control clip 150 extends generally along the cable entry axis A1-A1 of the cable entry port 104A and a portion of the cable 20 on the other side of the cable control clip 150 extends generally along the able exit axis A2-A2 of the cable exit port 104B.

With the cable 20 and the cable control clip 150 thus installed, the top housing part 110 and the bottom housing part 120 can be relatively pivoted about the hinge 102 into the closed position as shown in FIGS. 3 and 6. The cable control clip 150 and the access opening 21 are thereby contained in the chamber 106. Once the housing parts 110, 130 are closed, the clip 108 can be applied to the latch structures 114, 124 to secure the housing 111 in its closed position.

The sealant masses 52, 54 can provide an environmental seal about the portions of the cable 20 in the cable entrance and exit ports 104A, 104B.

The closure of the assembly 100 also provides a perimeter environmental seal. The perimeter seal is created by the sealant channel 115, the perimeter sealant 50 and the perimeter flange 125. As the housing parts 110, 120 are closed, the flange 125 enters the channel 115 and displaces the sealant 50. This perimeter seal may be maintained so long as the latch structures remain interlocked.

The cable control clip 150 limits or prevents contact between portions of the uncut (express) optical fibers 28 in or at the access opening 21 and the other components of the cable 20, namely, the jacket 22, the strength members 24, the metal shield layer 27 and the buffer tube 26. In this manner, the cable control clip 150 can prevent, impede, or reduce the risk of one or more of these components impinging on and damaging the fibers 28. In particular, the clip 150 can contain the strength members 24, which have been exposed by the scallop forming the access opening 21. The rounded end edges 164B of the clip member 160 can prevent or reduce the risk of damage to the fibers 28 from the clip 150 itself.

The cable control clip 150 can also limit the displacement of the housing 111 with respect to the cable 20. Axial (i.e., cable lengthwise) displacement of the clip 150 with respect to the cable 20 is bounded by the endwise edges 26A of the access opening 21. Because the clip 150 is captured within (and, more particularly affixed to) the housing 111, axial displacement of the housing 111 is likewise limited by the engagement between the clip 150 and the cable 20. The clip 150 can thus limit or even prevent cable pullout from the housing 111. The clip 150 may also limit or prevent buckling of the strength members 24 under columnar loading.

The cable control clip 150 may also limit or prevent rotation of the housing 111 about the axis B-B (FIG. 2) of the cable 20. The cable control clip 150 may provide strain relief for the cable at the housing 111.

According to some embodiments, the cable 20 is relatively loosely held by the clip 150 so that the cable 20 can longitudinally float within the clip 150, bounded by the end edges 26A of the access opening 21. According to some embodiments, the clip 150 clamps onto or grips the uncut portion of the cable 20 to prevent or inhibit the cable 20 from sliding axially within the clip 150. The grip on the cable 20 may be aided by the teeth 175.

Because the cable entry axis A1-A1 (FIG. 1) and the cable exit axis A2-A2 in some embodiments are non-parallel (i.e., extend at an angle to one another), the corresponding entering and exiting portions 20A and 20B of the cable 20 are non-parallel. Typically, the cables in a taut sheath enclosure enter and exit the closure along the same axis. Such a conventional arrangement generally results in fairly long overall closure length. In a buried environment, a substantially larger handhole may be required in order to make this arrangement fit because the closure and the entering/exiting cable has an extended length. Typically, the main cable is in a circular coil within the handhole, and to install the taut sheath closure requires that a substantial section of that circular coil be "straightened out". By providing an enclosure assembly 100 that causes the cable entering portion 20A and the cable exiting portion 20B to be angled with respect to one another, some embodiments of the present invention may allow the cable 20 to pass into and out of the enclosure assembly 100 with no or reduced disturbance of the circular coil shape. By doing this (even at relatively shallow angles), the cable 20 may be re-coiled, after installing the enclosure assembly 100, to a diameter that still fits a smaller handhole without bending the cable 20 sharply at the entrance/exit point to the enclosure assembly 100. According to some embodiments and as shown, the access opening 21 faces outwardly with respect to the included angle defined by the cable entry axis A1-A1 and the cable exit axis A2-A2 (i.e. the access opening 21 is not positioned within the angle). Bending of the cable 20 within the housing 111 may be facilitated by the orientation of the cable 20 with the access opening 21 at the outside of the bend (i.e., facing away from the enclosed angle defined by the axes A1-A1 and A2-A2) and the strength members 24 at the six o'clock and twelve o'clock positions. According to some embodiments, the length of the cable 20 including the enclosure assembly 100 is coiled with a diameter of no more than 91 centimeters.

The bend in the cable 20 in the chamber 106 may be formed and maintained by the relative positioning of the cable control clip 150 and/or the configurations of the cable cutouts 116A, 126A (FIG. 1). For example, in the embodiment illustrated in FIG. 1, the clip 150 (when installed) holds the centerline B-B of the cable 20 forwardly (i.e., toward the splice tray 35) of the centerlines of the cable ports 104A, 104B. Also, in the illustrated embodiment, each cable port axis A1-A1, A2-A2 is defined by the centerlines of the respective cutouts 116A, 126A defining the cable ports 104A, 104B. That is, the inner cutouts 116A, 126A are staggered or offset with respect to the outer cutouts 116A, 126A so that the centerlines of the cutouts 116A, 126A are not coaxial. However, other mechanisms or configurations may be used to form and/or maintain the arcuate bend in the cable 20 in accordance with other embodiments of the present invention.

Figure 9:
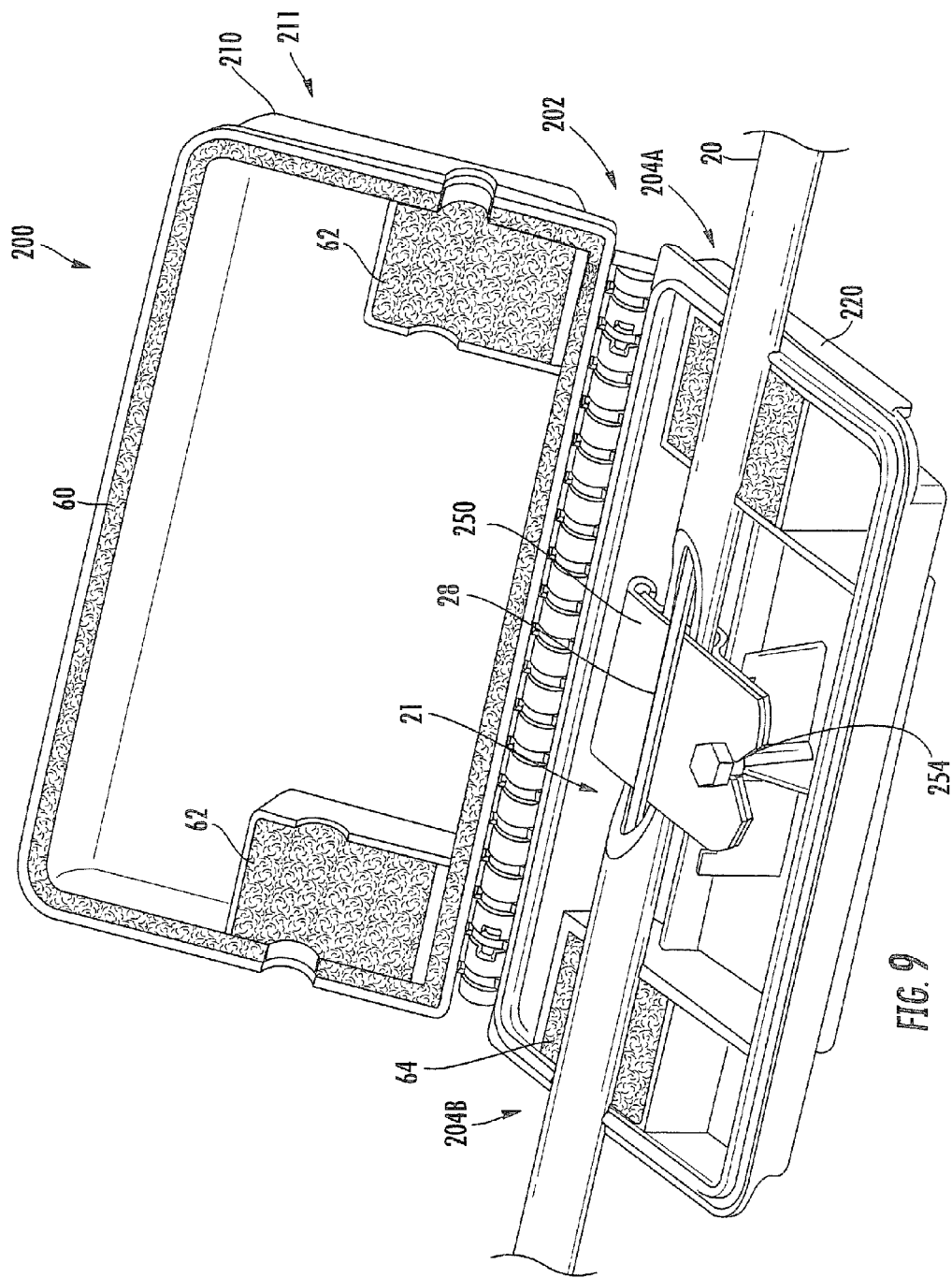
FIG. 9 is a perspective view of a cable enclosure assembly according to further embodiments of the present invention in an open position.
Figure 10:
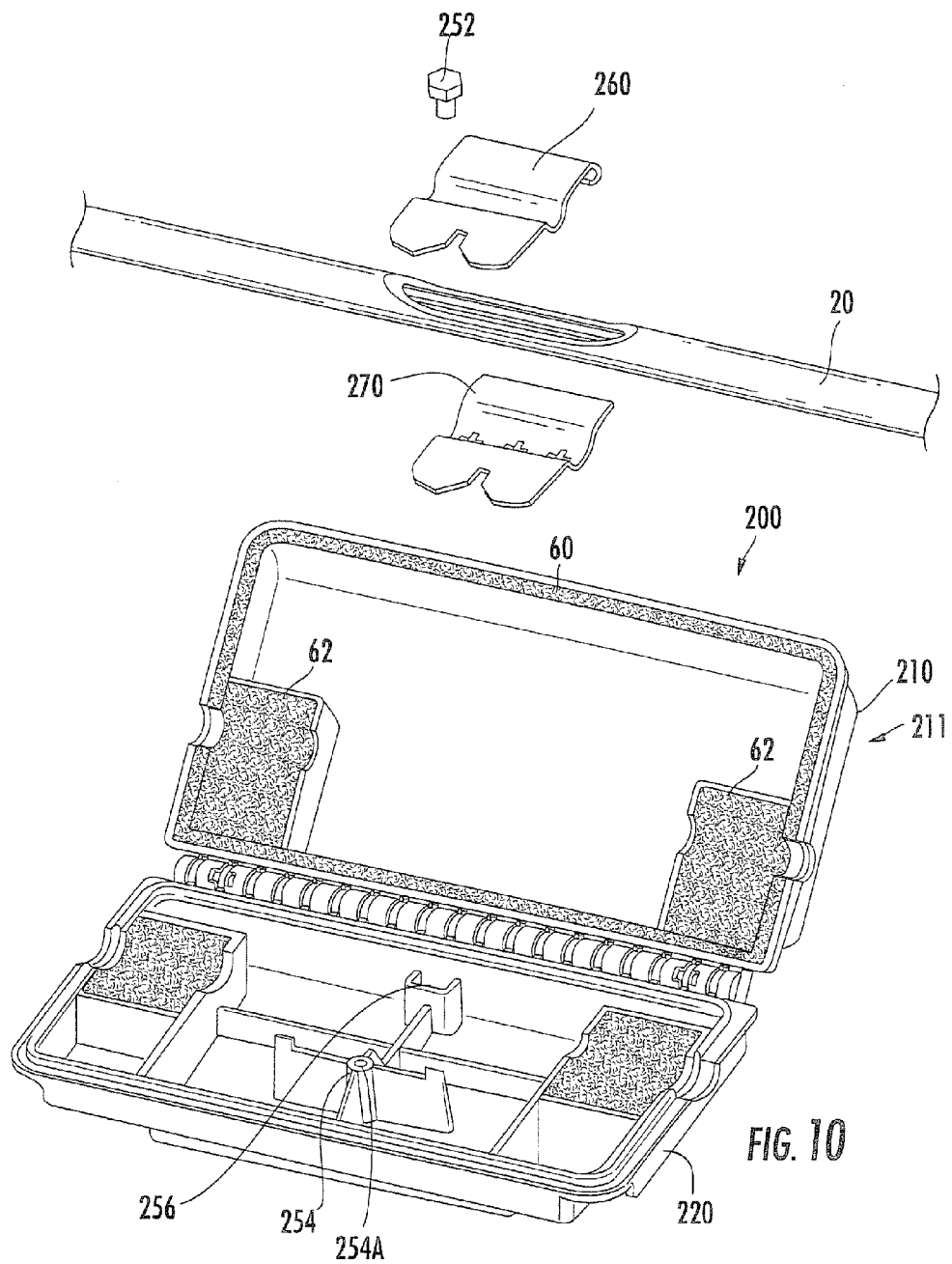
FIG. 10 is an exploded, perspective view of the cable enclosure assembly of FIG. 9 in the open position.
Figure 11:
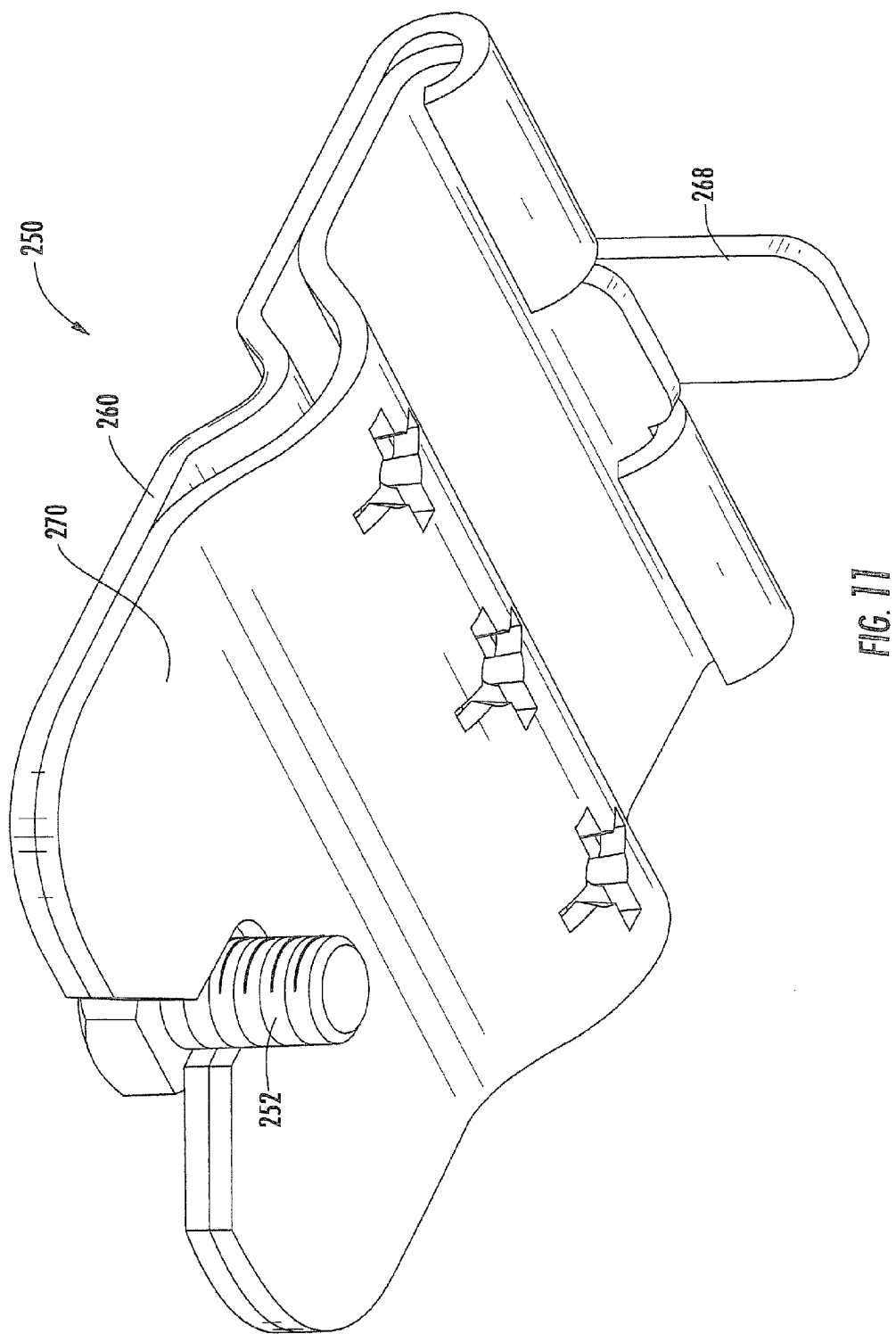
FIG. 11 is an enlarged, bottom, perspective view of a cable control clip according to further embodiments of the present invention and forming a part of the cable enclosure assembly of FIG. 9.
Figure 12:
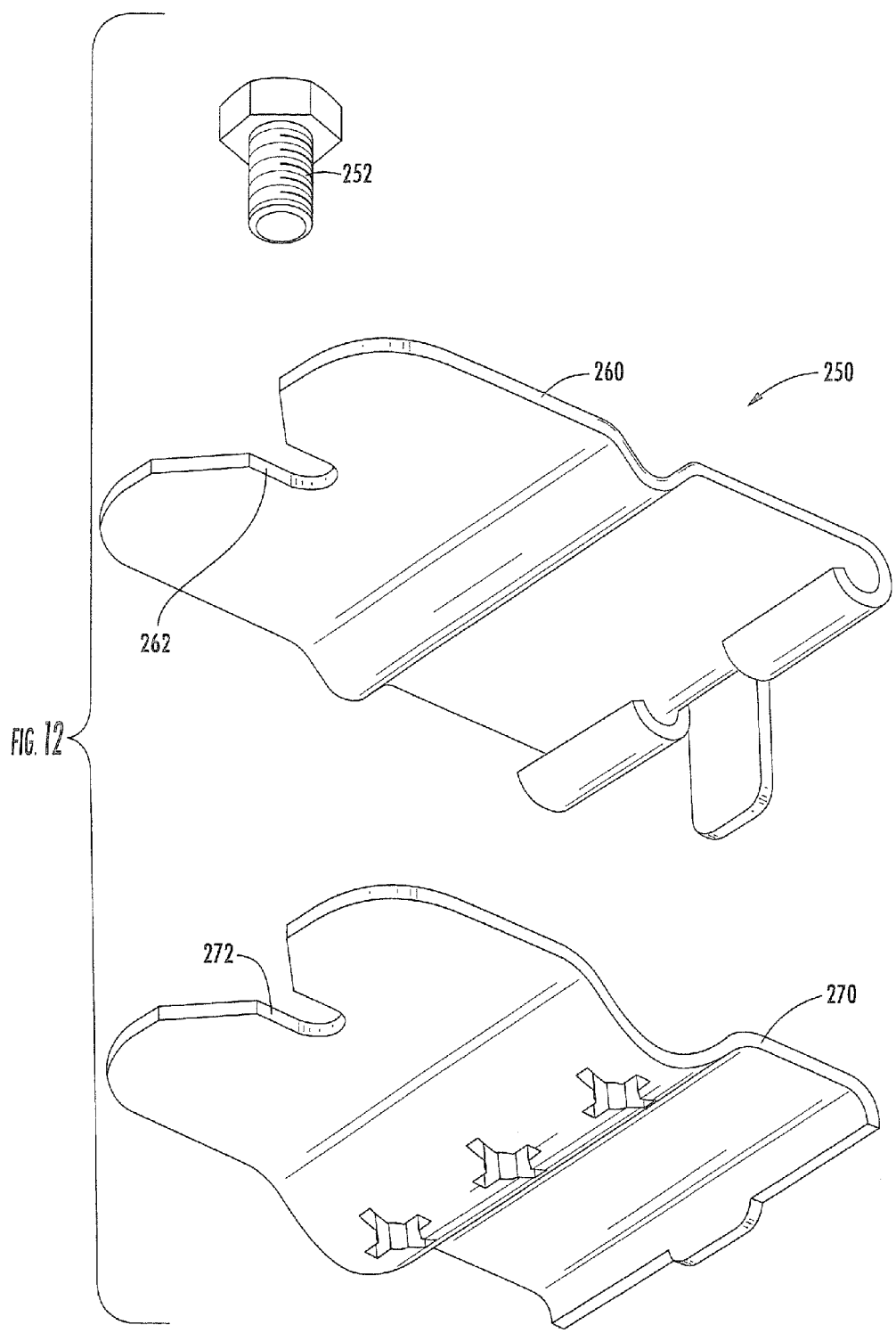
FIG. 12 is an exploded, enlarged, bottom perspective view of the cable control clip of FIG. 11.

With reference to FIGS. 9-13, a fiber optic cable enclosure assembly 200 according to further embodiments of the present invention is shown therein. As shown in FIGS. 9 and 10, the assembly 200 includes an enclosure housing 211 (including a top housing part 210 and a bottom housing part 220), a hinge 202, two upper masses of flowable cable sealant 62, two lower masses of flowable cable sealant 64, a flowable perimeter sealant 60, and a latch clip 208 (FIG. 13) generally corresponding to the housing parts 110, 120, the hinge 102, the sealant masses 52, 54, 50, and the clip 108, respectively, of the assembly 100. The enclosure assembly 200 further includes a cable control clip 250 according to further embodiments of the present invention.

Figure 13:
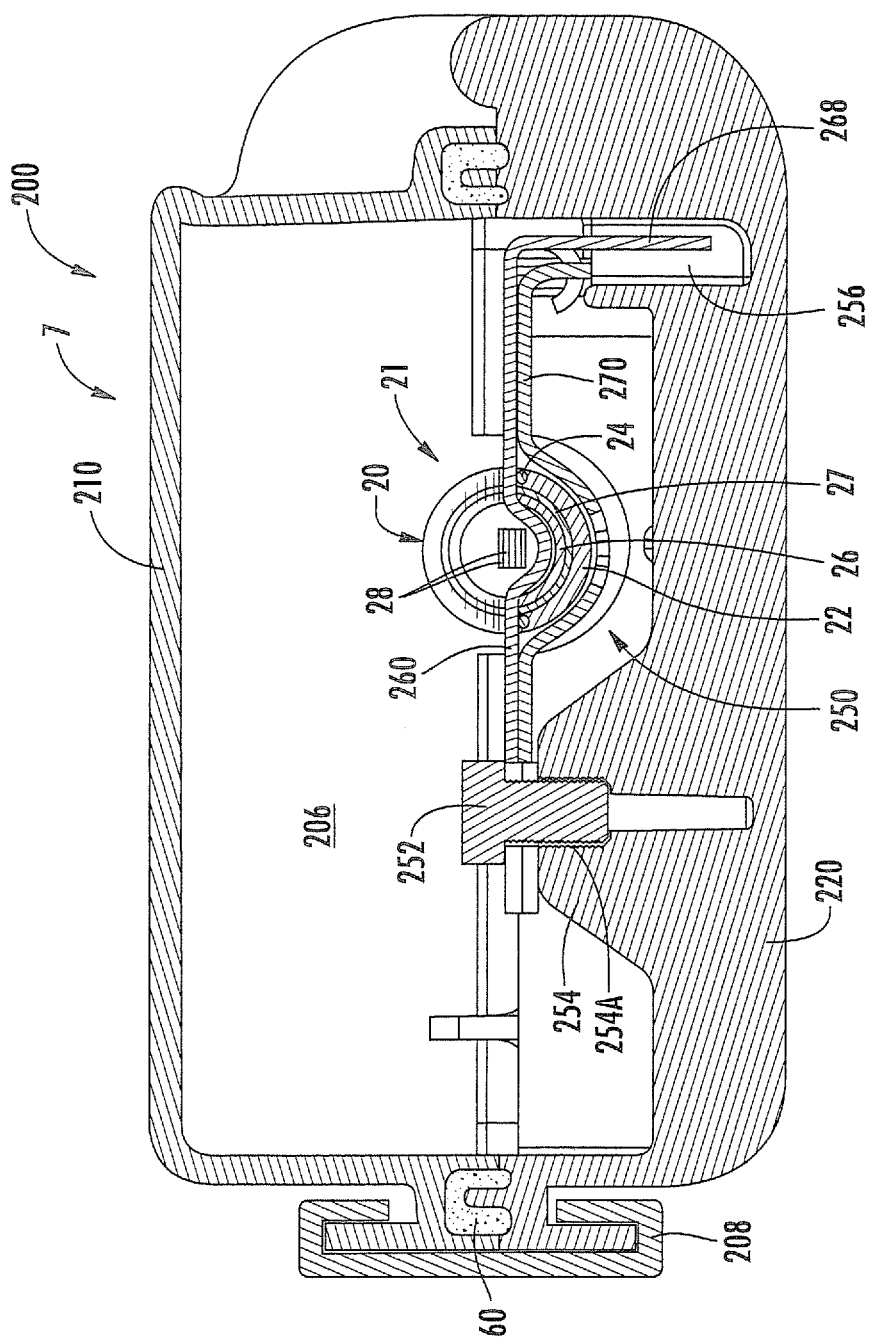
FIG. 13 is an enlarged, central cross-sectional view of the cable enclosure assembly of FIG. 9, wherein a cable is installed in the cable enclosure assembly.

The housing parts 210, 220 are relatively pivotable about the hinge 202 between an open position as shown in FIG. 9 and a closed position as shown in FIG. 13. In the closed position, the housing 211 defines a chamber 206 (FIG. 13). An entry cable port 204A and an exit cable port 204B (FIG. 9) communicate with the chamber 206 and the exterior of the housing 211. The assembly 200 may be used with the cable 20 to form an enclosed cable assembly 7 (FIG. 13) to environmentally protect an access opening 21 formed in the jacket 22 of the cable 20, for example.

The bottom housing part 220 differs from the bottom housing part 120 in that the bottom housing part 220 includes a clip mount post 254, a clip bolt hole 254A in the clip mount post 254, and a rear stabilizer slot 256 (FIG. 10).

The cable control clip 250 may be formed of materials as discussed above with regard to the cable control clip 150. The housing parts 210, 220 may be formed of materials as discussed above with regard to the housing parts 110, 120. The sealants 60, 62, 64 may be formed of materials as discussed above with regard to the sealants 50, 52, 54.

The assembly 200 may be used in the same manner as the assembly 100 to form a splice connection assembly 7, for example, except as follows. The cable control clip 250 (FIGS. 11 and 12) includes top and bottom clip members 260 and 270 corresponding to clip members 160 and 170, except that the clip members 260, 270 do not have bends corresponding to the bends 169A, 179A. Also the clip member 260 further includes a stabilizer tab 268 depending from the second end thereof.

The cable control clip 250 and the enclosure 200 can generally be used in the same manner as the cable control clip 150 and the enclosure 100 except that the cable 20 will be differently oriented in the housing and the stabilizer tab 268 is received in the stabilizer slot 256. The clip members 260, 270 are secured to the bottom housing part 220 by a bolt 252 that engages the bolt hole 254A through the bolt slots 262, 272. The assembled and closed splice connection assembly 7 is shown in its closed configuration in FIG. 13.

According to some embodiments of the invention, the enclosure assemblies 100, 200 may be used in combination to form a fiber optic cable enclosure system 15 as shown in FIG. 14. In accordance with methods of the present invention, two access openings 21A, 21B are each formed in the cable 20 at longitudinally spaced apart locations. Each access opening 21A, 21B is generally formed, constructed and configured in the manner discussed herein with respect to FIG. 8.

A selected one or more of the plurality of optical fibers 28 is accessed through and cut at the first opening 21A. The selected one of the plurality of optical fibers is accessed at the second opening 21B and a length of the selected one of the plurality of optical fibers 28 is drawn from the second opening 21B to provide a selected length of the one or more fibers 28. The respective selected fiber or fibers 28 may then be spliced to an optical fiber or fibers in a drop cable or drop cables 30. The splices and the access opening 21B may then by environmentally protected by mounting the enclosure assembly 100 on the portion of the cable 20 about the access opening 21B in the manner described above with the reference to FIGS. 1-7. The access opening 21A may be environmentally protected by mounting the enclosure assembly 200 on the portion of the cable 20 about the access opening 21A in the manner described above with reference to FIGS. 9-13. Mounting of the enclosure assemblies 100, 200 includes securing the cable control clip 150 to the respective cable portion and to the housing 111 as described above, and securing the cable control clip 250 to the respective cable portion and to the housing 211 as described above.

According to some embodiments, the second enclosure assembly 200 is a low-volume, in-line closure provided to environmentally seal the first opening 21A where the selected fiber or fibers 28 are originally cut. The larger enclosure assembly 100 is configured to cover the second opening 21A where a selected length of the fiber or fibers 28 are drawn. Splices to respective drop cables 30 may be accommodated on a splice tray or the like within the enclosure assembly 100. A closure kit including the enclosure assembly 100 and the enclosure assembly 200 may also be provided in some embodiments of the present invention. However, in some embodiments only a single opening 21B is provided and a pair of enclosure assemblies may not be needed and a single enclosure, such as the enclosure assembly 100, may be used to accommodate splices.

According to some embodiments, the access openings 21A, 21B are formed using apparatus and/or methods as disclosed in U.S. patent application Ser. No. 12/194,178, filed Aug. 19, 2008, the disclosure of which is incorporated herein by reference.

With reference to FIG. 15, a cable control clip 350 according to further embodiments of the present invention is shown therein. The cable control clip 350 corresponds to the cable control clip 250, except that the cable control clip 350 is unitarily formed with a top portion 360 (corresponding to the top clip member 260) and a bottom portion 370 (corresponding to the bottom clip member 270) being integrally formed with and connected by a bend portion 367. According to some embodiments, the clip 350 is unitarily molded or cast or formed (e.g., by stamping) from a unitary piece.

The cable control clip 350 may be used in the same manner as the cable control clip 250, except that the clip 350 is temporarily spread open about the bend portion 367 to permit insertion of the clip 350 into the cable 20, and thereafter returned or permitted to return to a closed position to capture the cable 20.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention. Therefore, it is to be understood that the foregoing is illustrative of the present invention and is not to be construed as limited to the specific embodiments disclosed, and that modifications to the disclosed embodiments, as well as other embodiments, are intended to be included within the scope of the invention.

That which is claimed is:

1. An enclosure assembly for use with a fiber optic cable, the cable having a lengthwise cable axis and including a plurality of optical fibers and a jacket surrounding the optical fibers, the enclosure assembly comprising:
    an enclosure housing defining a chamber to receive the cable; and
    a cable control clip configured to be inserted through the cable to extend radially between the optical fibers and the jacket to limit contact between the optical fibers and one or more other components of the cable, and to limit displacement of the enclosure housing relative to the cable when the cable control clip is disposed in the chamber;
wherein:
    the cable control clip includes a unitarily formed clip member, the clip member including a first wall and a second wall connected by a bend portion; and
    the clip member is configured to loop around the cable such that the first wall extends between the optical fibers and the jacket, and the second wall extends around an exterior of the jacket.

2. The enclosure assembly of claim 1 wherein the cable control clip is affixed to the enclosure housing.

3. The enclosure assembly of claim 1 wherein the cable control clip is configured to grip the cable.

4. The enclosure assembly of claim 3 wherein the cable control clip includes at least one projection configured to embed into the jacket to resist axial displacement of the jacket relative to the cable control clip.

5. The enclosure assembly of claim 1 wherein, when mounted on the cable, the cable control clip permits the cable to float axially a limited distance with respect to the cable control clip.

6. The enclosure assembly of claim 1 wherein the cable control clip is configured to extend radially between the optical fibers and the jacket and a strength member forming a part of the cable concurrently such that the cable control clip limits contact between the optical fibers and the strength member.

7. The enclosure assembly of claim 1 wherein the cable control clip is metal.

8. The enclosure assembly of claim 1 wherein the housing includes:
    a cable entrance port in communication with the chamber and configured to receive the cable therethrough along an entrance axis; and
    a cable exit port in communication with the chamber and configured to receive the cable therethrough along an exit axis;
    wherein the entrance axis and the exit axis are nonparallel with respect to one another.

9. The enclosure assembly of claim 1 in combination with a fiber optic cable to form an enclosed fiber optic cable assembly, wherein:
    the fiber optic cable has a lengthwise cable axis and includes a plurality of optical fibers and a jacket surrounding the optical fibers;
    the cable control clip is inserted through the cable and extends radially between the optical fibers and the jacket, and is disposed in the chamber; and
    the cable control clip limits contact between the optical fibers and one or more other components of the cable and limits displacement of the enclosure housing relative to the cable.

10. The enclosure assembly of claim 9 wherein:
    the cable further includes a buffer tube and a strength member; and
    the cable control clip extends radially between the optical fibers and the jacket, the strength member and the buffer tube concurrently and limits contact between the optical fibers and the strength member and the buffer tube.

11. A cable control clip for use with a fiber optic cable and an enclosure housing, the cable having a lengthwise cable axis and including a plurality of optical fibers and a jacket surrounding the optical fibers, the enclosure housing defining a chamber to receive the cable, the cable control clip being configured to be inserted through the cable to extend radially between the optical fibers and the jacket to limit contact between the optical fibers and one or more other components of the cable, and to limit displacement of the enclosure housing relative to the cable when the cable control clip is disposed in the chamber; wherein:

the cable control clip includes a unitarily formed clip member, the clip member including a first wall and a second wall connected by a bend portion; and the clip member is configured to loop around the cable such that the first wall extends between the optical fibers and the jacket, and the second wall extends around an exterior of the jacket.

12. A method for enclosing a portion of a fiber optic cable, the cable having a lengthwise cable axis and including a plurality of optical fibers and a jacket surrounding the optical fibers, the method comprising:

inserting a cable control clip through the cable such that the cable control clip extends radially between the optical fibers and the jacket; and placing the cable and the cable control clip in a chamber of an enclosure housing, wherein the cable control clip limits contact between the optical fibers and one or more other components of the cable and limits displacement of the enclosure housing relative to the cable;

wherein inserting the cable control clip through the cable is preceded by removing a scalloped segment of the jacket to form a longitudinally extending access opening through which the optical fibers are accessible, and wherein inserting the cable control clip through the cable includes inserting the cable control clip through the access opening.

13. The method of claim 12 including affixing the cable control clip to the enclosure housing.

14. The method of claim 12 wherein inserting the cable control clip through the cable includes positioning the optical fibers in a fiber groove of the cable control clip.

15. The method of claim 12 wherein inserting the cable control clip through the cable includes inserting the cable control clip through the cable such that the cable control clip extends radially between the optical fibers and the jacket and a strength member of the cable and limits contact between the optical fibers and the strength member.

16. The method of claim 12 wherein inserting the cable control clip through the cable includes inserting the cable control clip through the access opening and between the jacket and portions of the optical fibers extending fully across the access opening uncut.

17. The method of claim 12 further comprising:

removing a second scalloped segment of the jacket to form a second longitudinally extending access opening at a second location axially spaced apart along a length of the cable from the first access opening and through which the optical fibers are accessible;

inserting a second cable control clip through the second access opening such that the second cable control clip extends radially between the optical fibers and the jacket at the second access opening; and placing the cable and the second cable control clip in a second chamber of a second enclosure housing, wherein the second cable control clip limits contact between the optical fibers and one or more other components of the cable and limits displacement of the second enclosure housing relative to the cable;

wherein the optical fibers extend fully through the first and second enclosure housings uncut; and wherein the jacket extends fully and continuously through the first and second enclosure housings.

18. A method for enclosing a portion of a fiber optic cable, the cable having a lengthwise cable axis and including a plurality of optical fibers and a jacket surrounding the optical fibers, the method comprising:

inserting a cable control clip through the cable such that the cable control clip extends radially between the optical fibers and the jacket; and placing the cable and the cable control clip in a chamber of an enclosure housing, wherein the cable control clip limits contact between the optical fibers and one or more other components of the cable and limits displacement of the enclosure housing relative to the cable;

wherein inserting the cable control clip through the cable includes positioning the optical fibers in a fiber groove of the cable control clip.

* * * * *

UNITED STATES PATENT AND TRADEMARK OFFICE
CERTIFICATE OF CORRECTION

| | |
|---|---|
| PATENT NO. | : 7,953,311 B2 |
| APPLICATION NO. | : 12/703622 |
| DATED | : May 31, 2011 |
| INVENTOR(S) | : Mullaney et al. |

Page 1 of 1

It is certified that error appears in the above-identified patent and that said Letters Patent is hereby corrected as shown below:

On Title Page:
Item (65) Related U.S. Application Data:
Please correct "12/198/298" to read -- 12/198,289 --

Signed and Sealed this
Fourth Day of October, 2011

David J. Kappos
*Director of the United States Patent and Trademark Office*